US00RE49312E

(19) United States
(12) Reissued Patent
Buckingham

(10) Patent Number: US RE49,312 E
(45) Date of Reissued Patent: Nov. 29, 2022

(54) HAND HELD DISC CLEANING TOOL FOR RECREATIONAL THROWING DISCS

(71) Applicant: Colin Richard Buckingham, Silverton, OR (US)

(72) Inventor: Colin Richard Buckingham, Silverton, OR (US)

(73) Assignee: Colin Richard Buckingham, Silverton, OR (US)

(21) Appl. No.: 17/316,723

(22) Filed: May 11, 2021

Related U.S. Patent Documents

Reissue of:
(64) Patent No.: 10,870,133
Issued: Dec. 22, 2020
Appl. No.: 15/966,951
Filed: Apr. 30, 2018

U.S. Applications:
(60) Provisional application No. 62/602,779, filed on May 6, 2017.

(51) Int. Cl.
*B08B 1/00* (2006.01)
*A47L 25/00* (2006.01)
*A63B 67/06* (2006.01)

(52) U.S. Cl.
CPC ..... *B08B 1/001* (2013.01); *A47L 25/00* (2013.01); *A63B 67/06* (2013.01)

(58) Field of Classification Search
CPC ..... B08B 1/001; B08B 1/002; B08B 1/006; B63B 7/00; B63B 7/06; B63B 225/30; B63B 65/10; A47L 25/00
See application file for complete search history.

(56) References Cited

U.S. PATENT DOCUMENTS

D278,390 S * 4/1985 Bailey ..... D4/130
4,554,699 A * 11/1985 Simmons ..... B25G 3/24 15/160
4,971,126 A * 11/1990 Borenstein ..... A63B 57/60 150/160
4,972,542 A * 11/1990 Moshos ..... A46B 5/0025 15/167.2
5,070,569 A * 12/1991 Wilkins ..... A46B 7/02 15/160

(Continued)

OTHER PUBLICATIONS

Jordan Fengel, "Disc Golf Disc Cleaning Part 2", youtube.com, Accessible at: https://www.youtube.com/watch?v=U_QhFuUPefQ&t (Year: 2012).*

*Primary Examiner* — Patricia L Engie

(57) ABSTRACT

Accordingly, it is the object of the present invention to provide an improved method for cleaning recreational throwing discs. One embodiment of my tool is roughly in the shape of a half circular pocket. The tool comprises of a spine 102 with a scrubbing material, and or absorbent material along the bottom longitudinal surface of the spine 108. Two body sections, one front 202F and one back 202R, both having an arched top edge 204. The two body sections have a scrubbing material, and or absorbent material attached to their interior faces 208. The spine is contiguous along its front edge 104F and back edge 104R to both arched top edges of both body sections 204. The resulting tool is configured so all scrubbing and or absorbent materials are located within the interior of the tool.

14 Claims, 10 Drawing Sheets

(56) References Cited

U.S. PATENT DOCUMENTS

Figure 1:
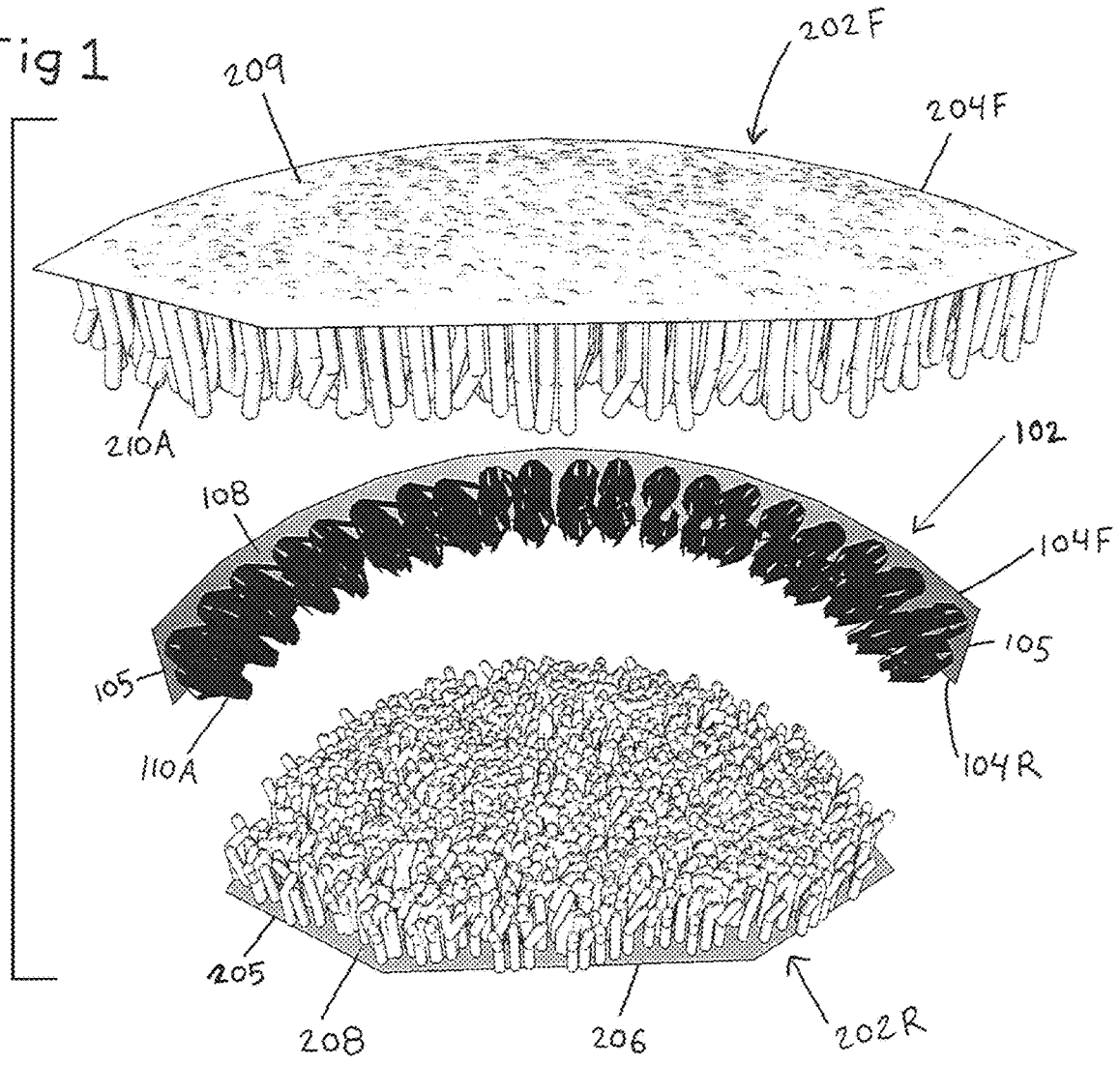

| | | | | | |
|---|---|---|---|---|---|
| 5,222,268 | A * | 6/1993 | Snodgrass | A46B 5/0012 | 15/105 |
| D341,720 | S * | 11/1993 | Bramley | D4/119 | |
| D350,232 | S * | 9/1994 | Stangarone | D32/42 | |
| 5,432,972 | A * | 7/1995 | Polzin | A46B 9/02 | 15/210.1 |
| 5,454,131 | A * | 10/1995 | Mackenzie | A47L 25/00 | 15/104.92 |
| 5,857,238 | A * | 1/1999 | Jmill | A46B 9/00 | 15/244.1 |
| 5,878,460 | A * | 3/1999 | Bruce | A46B 9/02 | 15/160 |
| 6,076,224 | A * | 6/2000 | Pacifico | A63B 47/04 | 15/210.1 |
| 6,226,827 | B1 * | 5/2001 | English, Jr. | A63B 57/60 | 15/210.1 |
| 7,363,677 | B1 * | 4/2008 | Owens | A46B 5/0033 | 15/161 |
| 9,409,070 | B2 * | 8/2016 | Johnson | A63B 60/64 | |
| 10,343,028 | B2 * | 7/2019 | Betz | B08B 3/04 | |
| 10,882,077 | B2 * | 1/2021 | Yang | B08B 3/08 | |
| 2012/0227198 | A1 * | 9/2012 | Blaszczec | A46B 5/0012 | 15/160 |
| 2014/0101875 | A1 * | 4/2014 | Fengel | B08B 3/04 | 15/104.92 |
| 2014/0352030 | A1 * | 12/2014 | Holland | A41D 19/0024 | 2/160 |
| 2016/0255947 | A1 * | 9/2016 | Ye | B08B 1/002 | |
| 2017/0072271 | A1 * | 3/2017 | Betz | A47L 25/00 | |
| 2018/0093147 | A1 * | 4/2018 | Sood | A47L 13/18 | |
| 2019/0060724 | A1 * | 2/2019 | Farina | A63B 57/60 | |
| 2019/0060967 | A1 * | 2/2019 | Fairbanks | B08B 1/002 | |
| 2020/0018996 | A1 * | 1/2020 | Schmitt | A44B 15/005 | |
| 2020/0130020 | A1 * | 4/2020 | Yang | B05B 1/02 | |

* cited by examiner

Fig 12
(New)
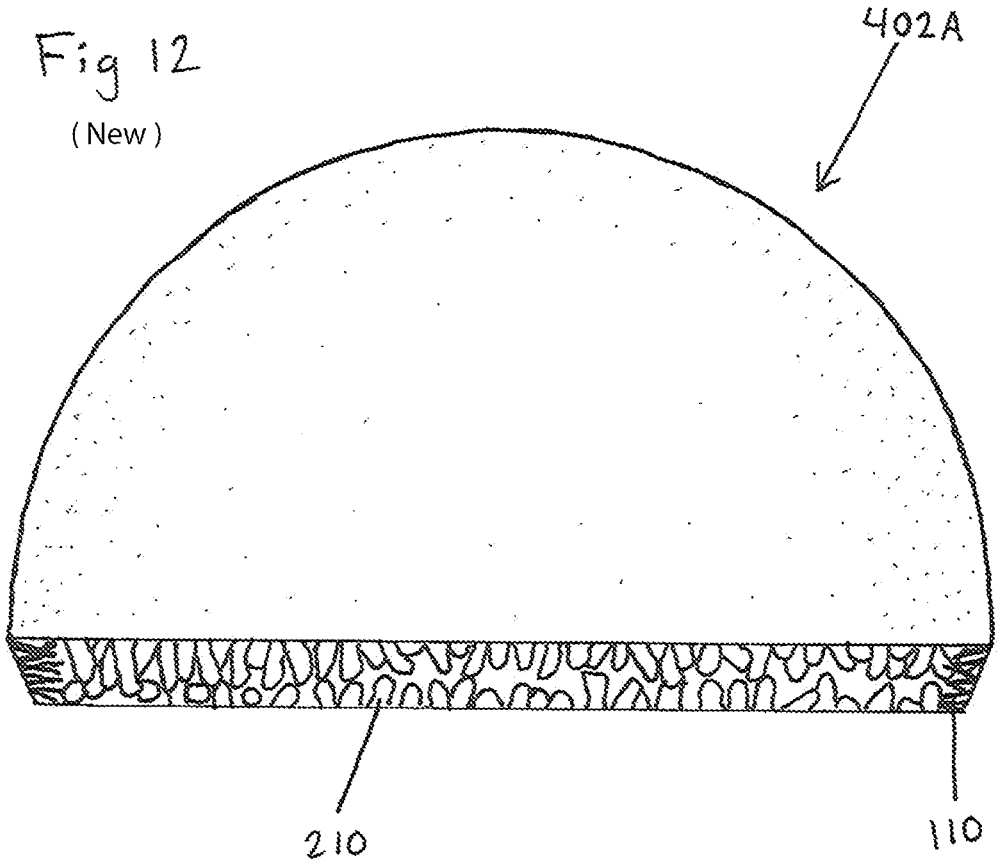

HAND HELD DISC CLEANING TOOL FOR RECREATIONAL THROWING DISCS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*This application claims benefit to provisional application Ser. No.* 62/602,779 *which was filed on May 6, 2017.*

BACKGROUND

Prior Art

The following is a tabulation of some prior art that seems relevant:

U.S. Patent Application Publications

| Publication Nr. | Kind Code | Publ. Dt | Applicant |
|---|---|---|---|
| 20090260166 | Al | 2009 Oct. 22 | Hartman et al. |
| 20140101875 | Al | 2014 Apr. 17 | Jordan Fengel |

Nonpatent Literature Documents www.thetowch.com

Disc golf is a game played outside, where discs are thrown from a pad or tee box and then thrown from where the previous disc landed in an attempt to place the disc within a receptacle in the fewest number of throws. The game of disc golf has many similarities to the game of golf (as one would assume from the name), the main differences being discs are used in place of golf balls, and the player's arm is used in place of golf clubs. Many people carry a bag designed to hold multiple discs and other items for playing the game. Players will often mark the location of the disc in play so there will be a visual indication of where they must throw from during their next shot, typically this is done with a small circular disc or "mini disc". Discs come in different weights, thicknesses, and different rim profiles. Discs designed for long distance (drivers) have a greater rim thickness, and a narrower rim profile then those designed for shorter distances (putters). The majority of discs I have played with have the same diameter, around 22 cm. The PDGA which governs the technical standards for discs used in the game of disc golf states that discs need to be from 21 cm to 30 cm in diameter.

During play the discs can become soiled by striking the ground, plants, bodies of water, or any other object in the area of play. Typically, players carry a towel to clean off their discs when they become dirty or wet. I have found that when a towel becomes dirty and the player uses it to clean a disc it can transfer that dirt or moisture to the user's hand. I have noticed that when I store a towel in my bag it can become buried under other items and does not store neatly, which can be an annoyance and shift the position of discs stored in the disc golf bag. Some players attach a towel to the outside of their bag and when they place the bag on the ground the towel can become dirty.

Robert Hartman has come up with a portable cleaning device for throwing discs entitled "Clean Glide". The "clean glide" is made up of a hinged container which has rotating cleaning pads on the interior and are driven by gears that are turned by a crack handle on the outside housing of the device. To clean a disc, one would have to open the device insert the disc close the lid and turn the handle. After the disc is cleaned it needs to be removed by opening the tool and taking it out of the tool housing. This action is time consuming and takes too many steps to complete its purpose. The complexity of the device would make it relatively costly to make and may lead to dysfunction of the device. It takes up considerable room and may be too heavy for some players liking. The "Clean Glide" device is a poorly devised solution to cleaning discs while out playing a game of disc golf.

Jordan Fengel created the "Disc golf disc washer" in an attempt to fill the need for a better cleaning device. His creation uses a reservoir to hold fluid and scrubbing areas within that reservoir to clean a disc. One embodiment is a stationary device attached to the ground which has a fluid reservoir, a washing chamber containing scrubbing areas, and an associated drain. The player inserts his disc into the washing chamber and cleans his disc by spinning it through this reservoir. This embodiment is problematic because players will want to clean their discs immediately after it has become soiled. It wouldn't make sense and would be very inconvenient to leave where the disc has landed to return to the cleaning device. This embodiment would take a considerable amount of time and money to produce and is not a good fit for the game of disc golf.

Another embodiment is a portable version of the earlier mentioned device, which also has a washing chamber containing fluid. The washing chamber is said to "include a material selected from the group of materials consisting of metals, ceramics, plastics, composites, and a combination thereof". From these materials the washing chamber would be ridged and may present a number of disadvantages: Increase it's weight, may be more problematic to store, limit it's ability to conform to the different contours of disc therefore hindering it's effectiveness. The use of fluid in the cleaning devices poses a problem of added weight, possible spillage, and the fact that it would cause the disc to become wet which some players may object to because it could affect their grip on the disc. To me this invention seems like an extrapolation of the popular golf ball washer found on many golf courses to the game of disc golf. This invention is not a good fit for the game of disc golf.

The "Towch" is another attempt to fill the need for a disc golf cleaning tool. The name comes from combining the words towel, and pouch. The disc golf "Towch" is in the shape of a pant pocket but much larger. The dimensions of the disc golf touch are 12.75" tall, and 10.5" wide. Players can insert their disc into the Towch by an opening on one side. The inside of the Towch is made of cotton yarn/thread. This tool takes more time than a towel to clean a disc since one needs to fully inset the disc into the "Towch" and then remove it.

SUMMARY

Accordingly, it is the object of the present invention to provide an improved method for cleaning recreational throwing discs. One embodiment is roughly in the shape of a half circle pocket. The tool comprises of a spine 102 with a scrubbing material 110, and or absorbent material 210 along the bottom longitudinal surface of the spine 108. Two body sections, made of a pliable material that can be deformed with the force typical of that of a user's hand, one front 202F and one back 202R, both having an arched top edge 204 which is a section of a circular arc roughly the same arc as discs used in the game of disc golf. The two body sections have a scrubbing material 110, and or absorbent material 210 attached to their interior faces 208. The spine is contiguous along its front edge 104F and back edge 104R to both arched top edges of both body sections 204. The resulting tool is configured so all scrubbing and or absorbent materials are adjacent to one another, forming the interior space of the hand-held disc cleaning tool. The user's hand can exert pressure on the tools surface to aid in contact of cleaning surfaces to the disc to be cleaned.

Advantages

Accordingly several advantages of one or more aspects are as follows: It stores neatly in a disc golf bag, compact, lightweight, high amount of cleaning surface area per it's footprint allows it to clean a multitude of discs, tool can be deformed manually by user's hand to conform to different disc contours, generally inexpensive to make, relatively simplistic design, easy to use, functions as a disc marker, functions as a desired line of flight marker, unique combination of materials may help reduce drag exerted on disc as it's passed through tool, unique combination of materials effectively remove foreign matter from discs, attractive design.

DRAWINGS, FIGURES

In the drawings, closely related components have the same number but different alphabetic suffixes.

FIG. 1 Exploded bottom perspective view of the handheld disk cleaning tool with synthetic blade array, and worm shaped microfiber material.

Figure 2:
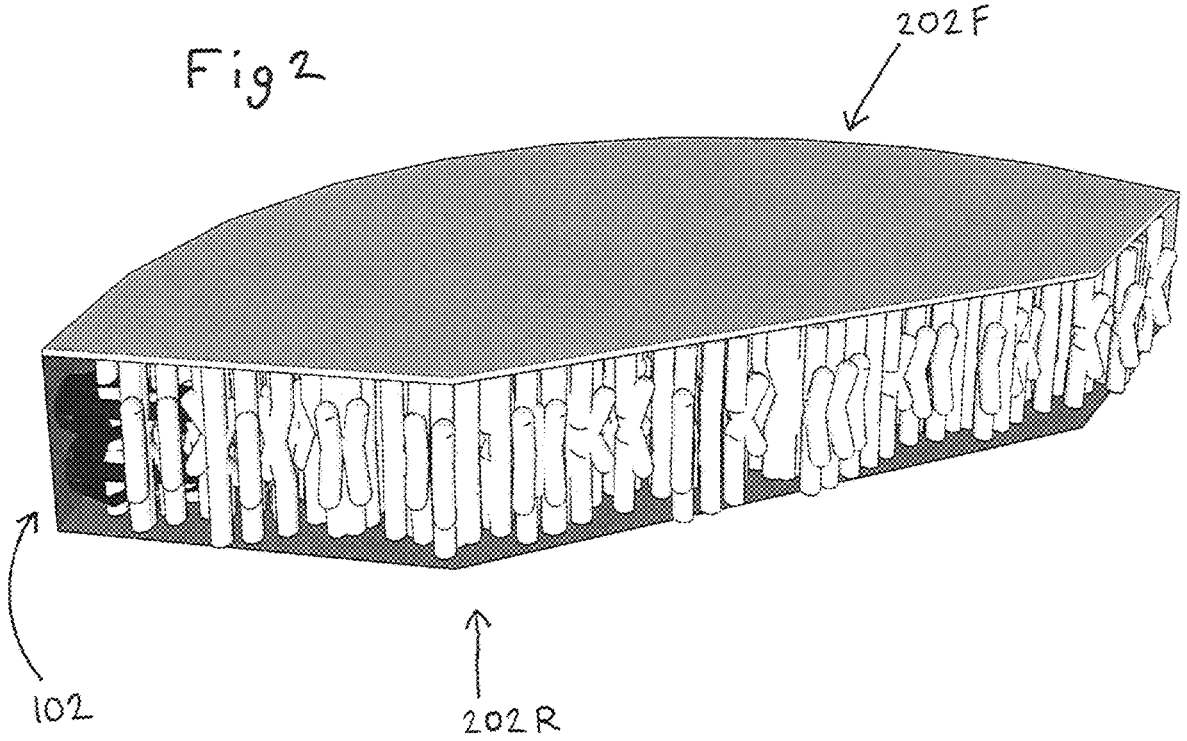

FIG. 2 Side perspective view of the hand-held disc cleaning tool.

Figure 3:
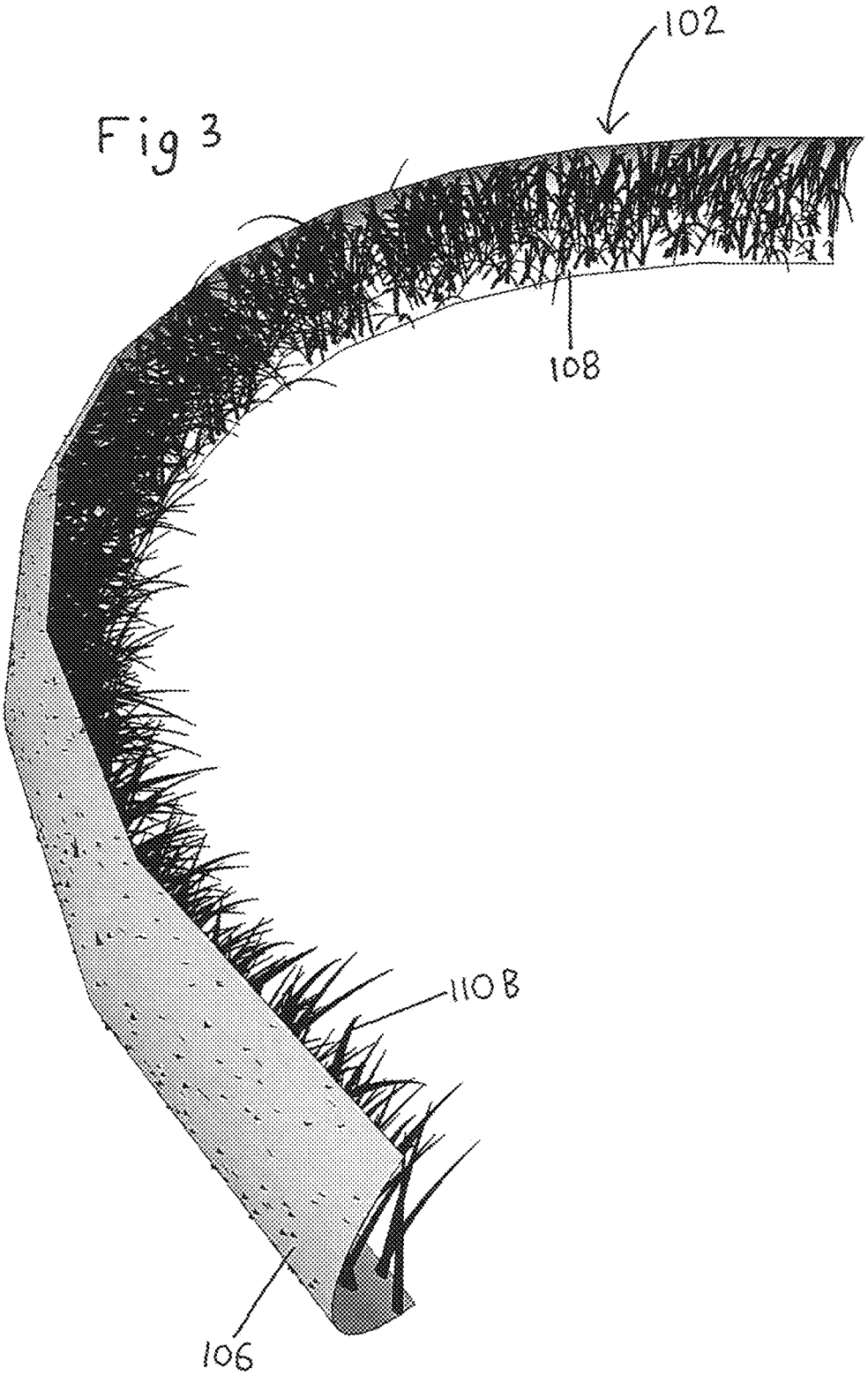

FIG. 3 Enlarged side perspective view of spine with turf like material along the spine's bottom longitudinal surface.

Figure 4:
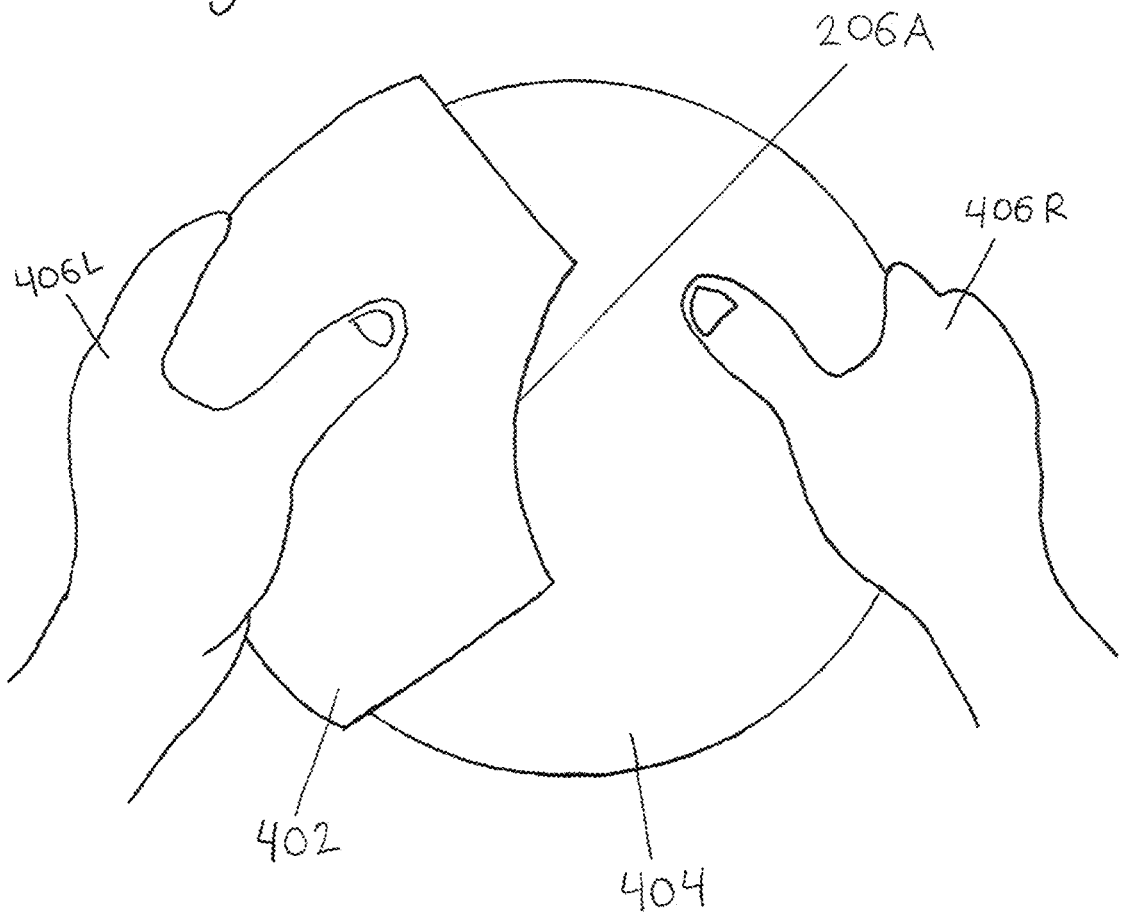

FIG. 4 Elevated view of the hand-held disc cleaning tool being used to clean a recreational throwing disc.

Figure 5:
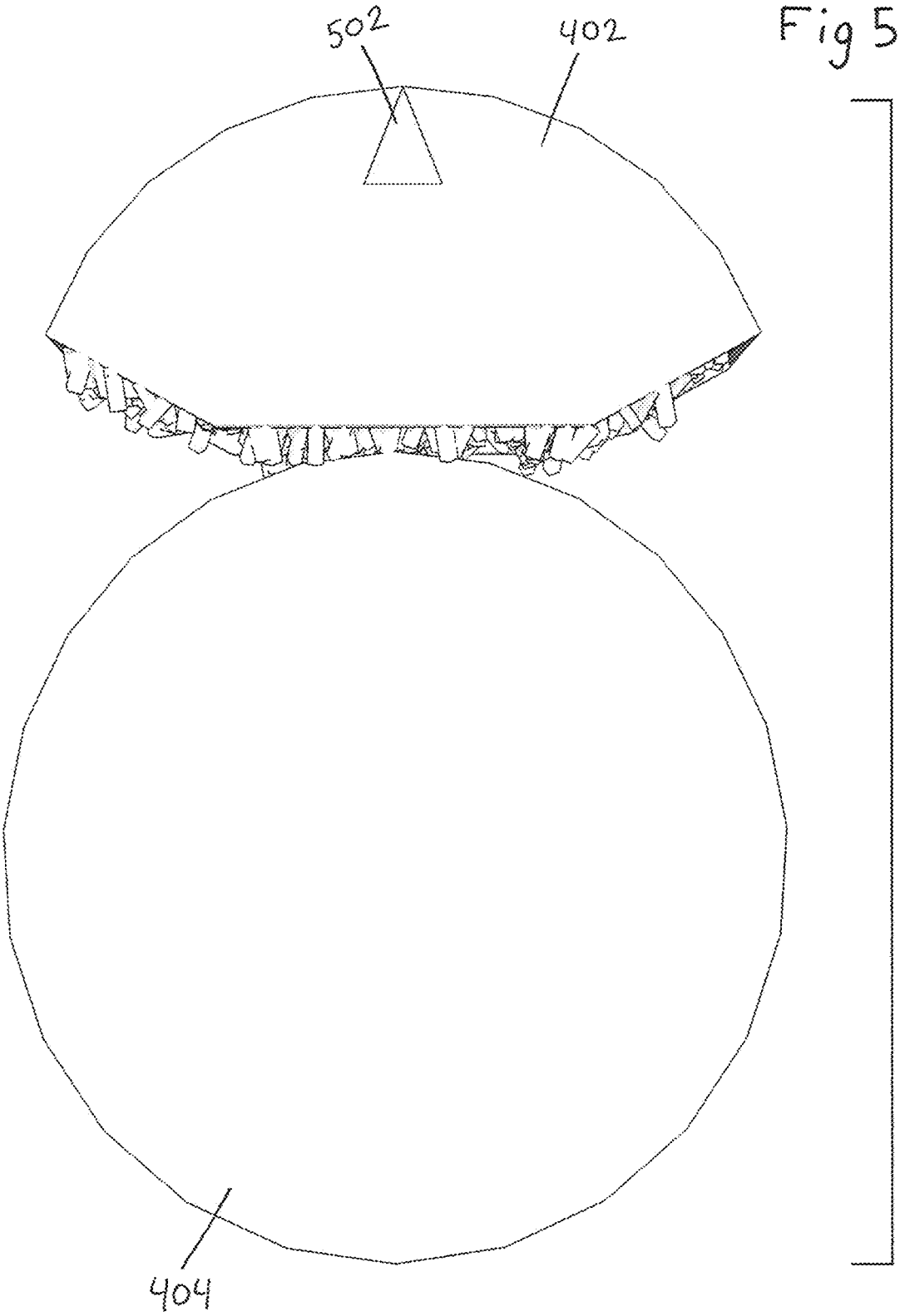

FIG. 5 Elevated view of the hand-held disc cleaning tool with shot alignment graphic being used as a disc marker and a desired line of flight marker.

Figure 6:
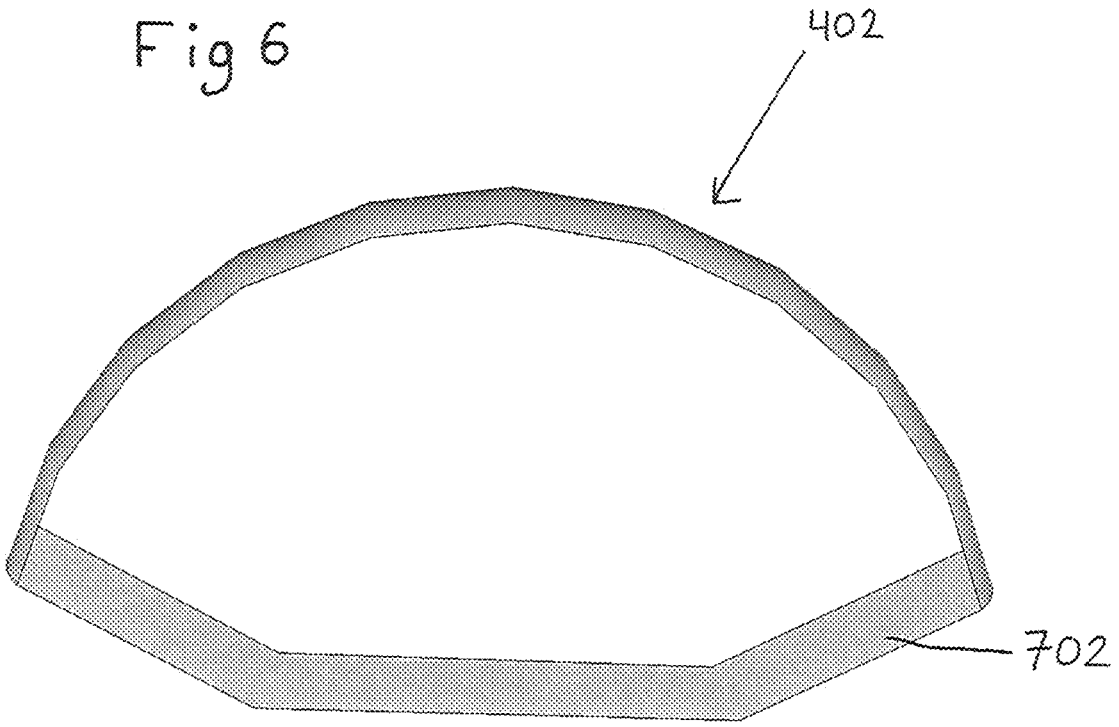

FIG. 6 Front perspective view of the hand-held disc cleaning tool with rigid or semi-rigid material along the spine's top longitudinal surface, and the exterior face of both body sections about the side and bottom edges.

Figure 7:
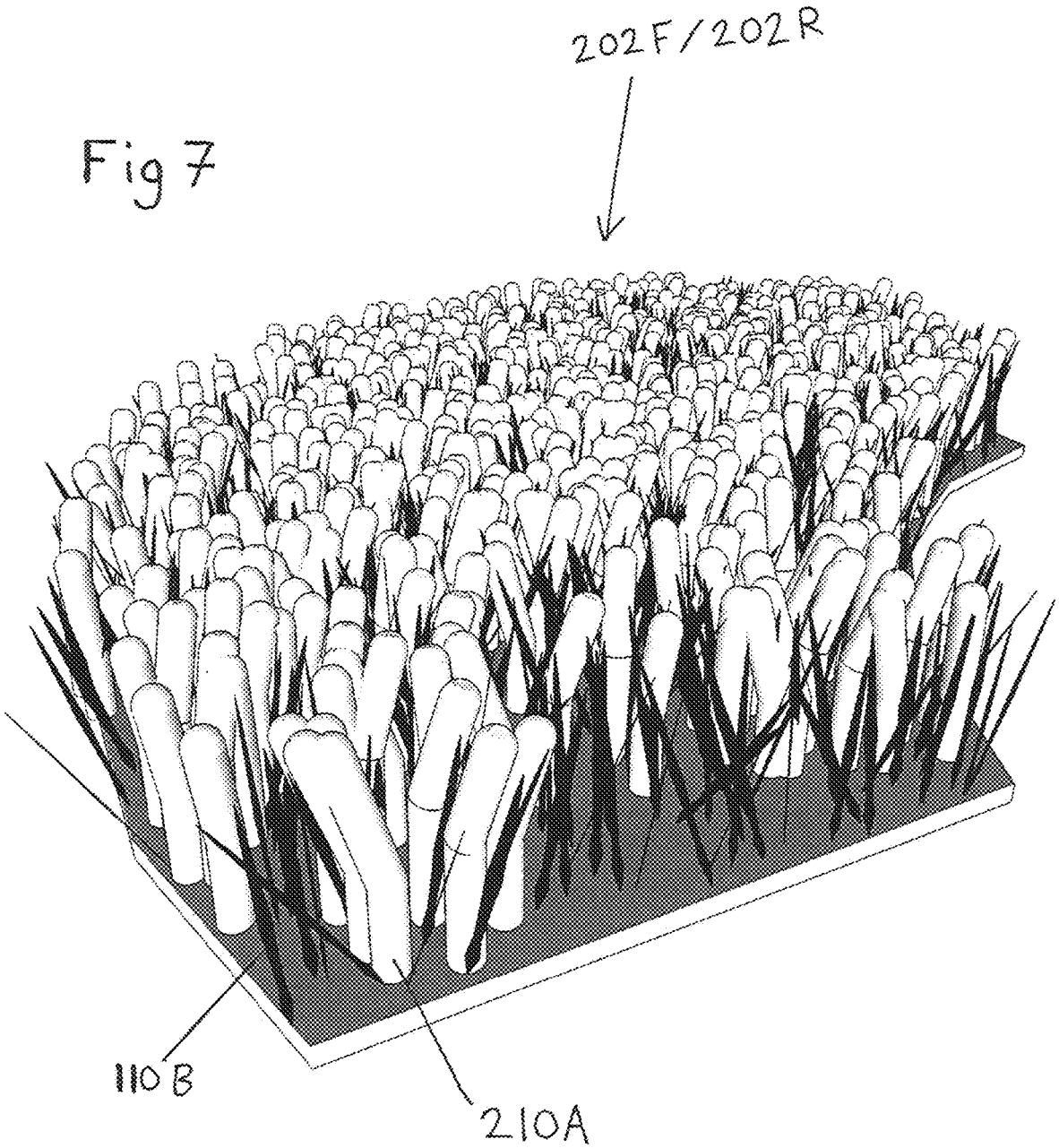

FIG. 7 Enlarged side perspective view of body section with worm shaped microfiber material and synthetic blades.

Figure 8:
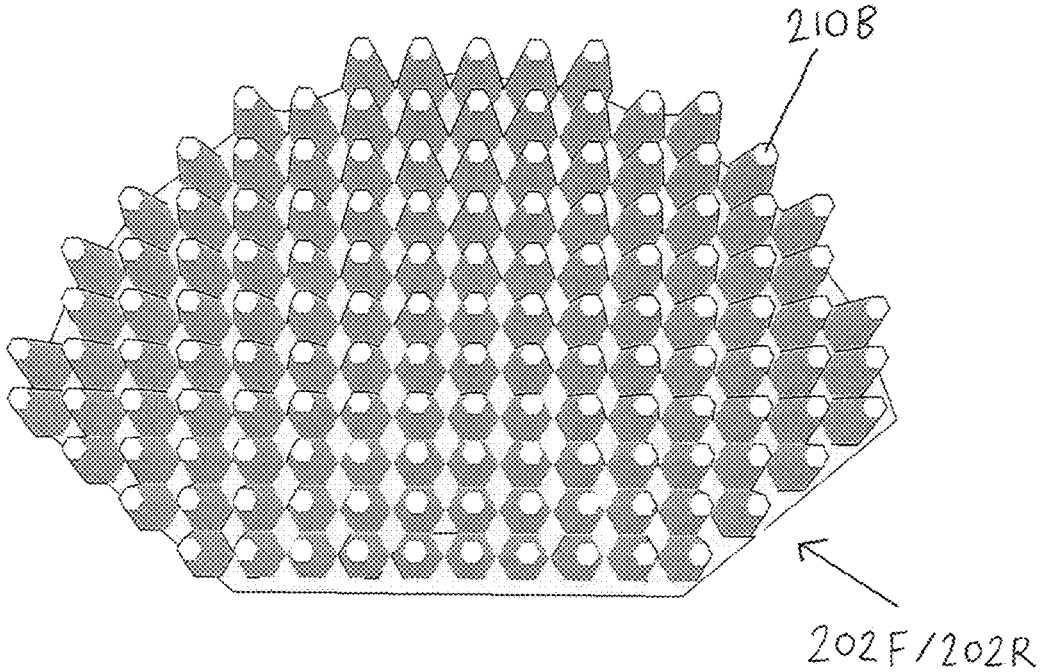

FIG. 8 Front view of body section with sponge like tapered material.

Figure 9:
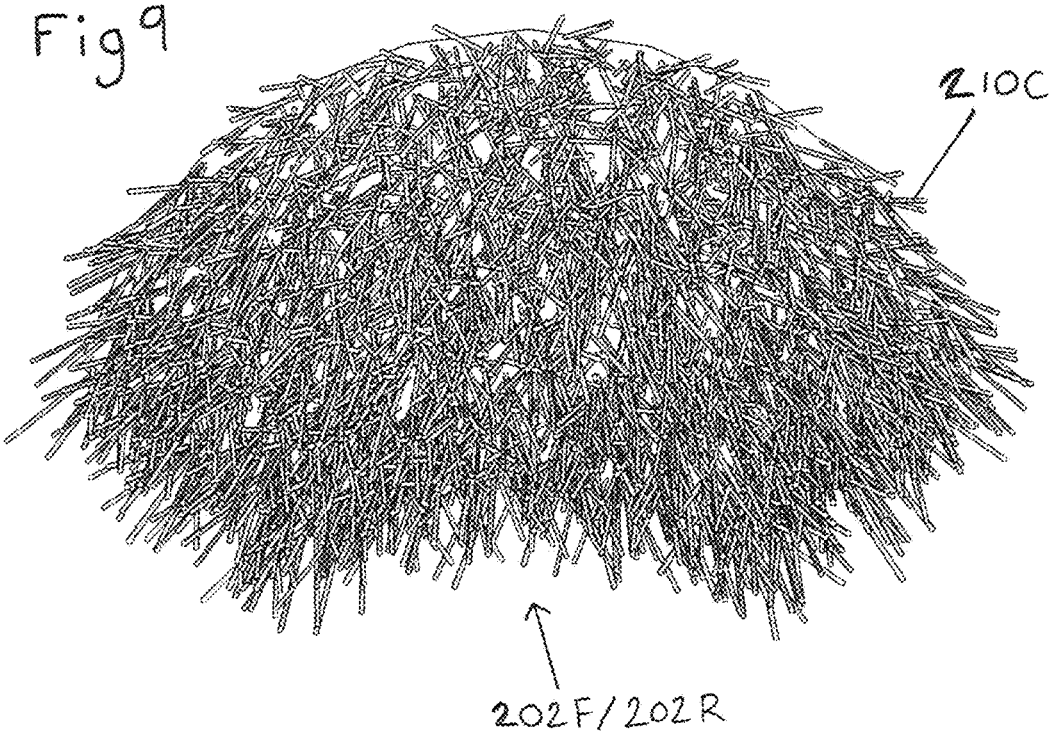

FIG. 9 Front view of body section with stands of absorbent material.

Figure 10:
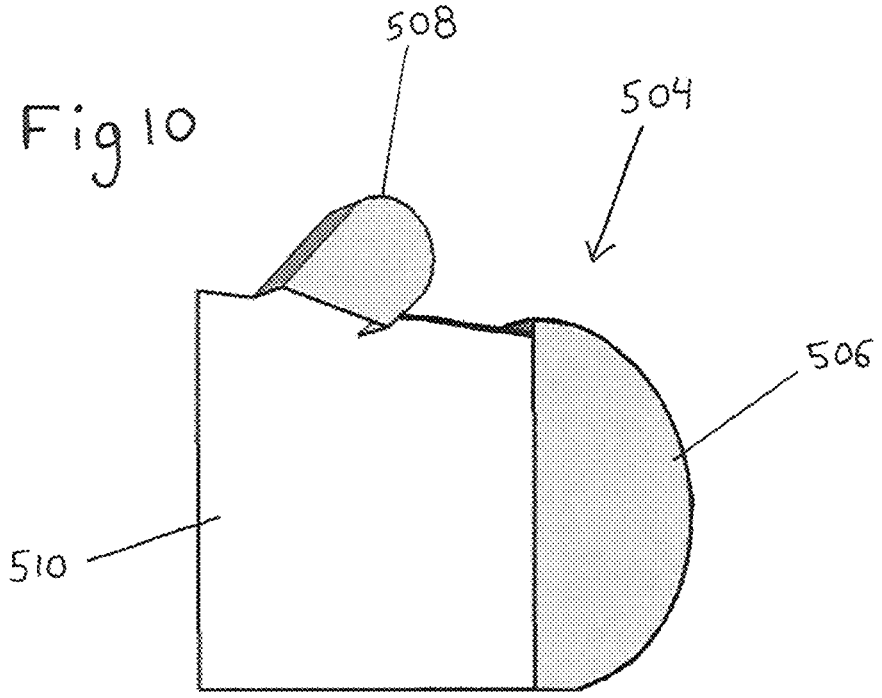

FIG. 10 Top perspective view of disc holding member.

Figure 11:
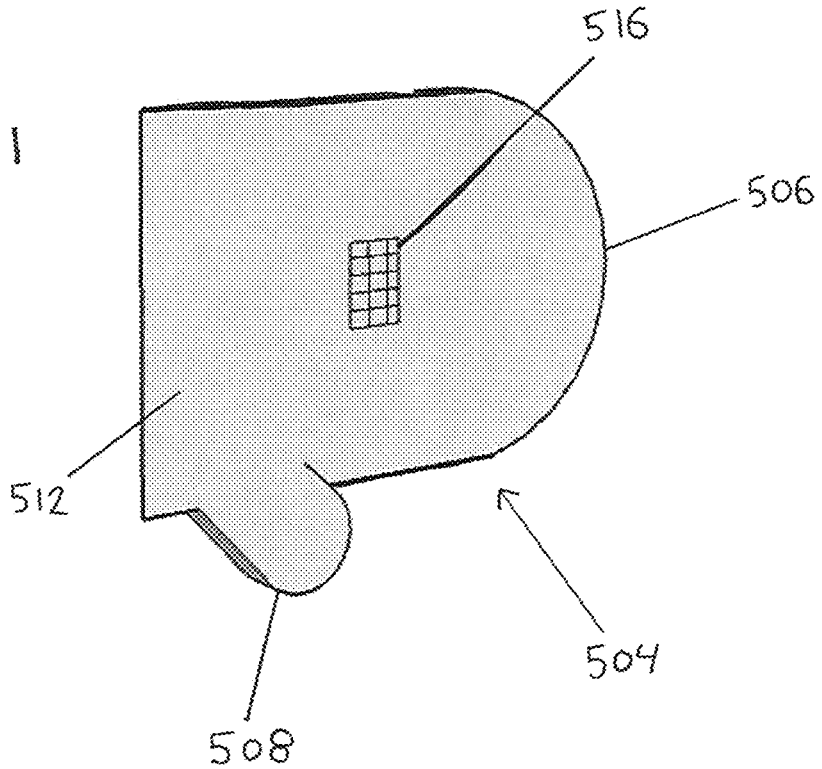

FIG. 11 Bottom perspective view of disc holding member with attachment means.

*FIG. 12 Top perspective view of half circle pocket hand-held disc cleaning tool.*

DRAWINGS REFERENCE NUMERALS

| | |
|---|---|
| 102 spine | 104F front edge of spine |
| 104R rear edge of spine | 105 side edge of spine |
| 106 top longitudinal surface of spine | 108 bottom longitudinal surface of spine |
| 110A synthetic blade array | 110B synthetic turf like material |
| 202F front body section | 202R rear body section |
| 204F top arched edge of front body section | 204R top arched edge of rear body section |
| 205 side edge of body section | 206 bottom edge of body section |
| 206A curved bottom edge of body section | 208 interior face of body section |
| 209 exterior face of body section | |
| 210A worm shaped micro fiber material | 210B tapered sponge |
| 210C strands of absorbent material | 402 hand-held disc cleaning tool |
| 404 recreational throwing disc | 406L user's left hand |
| 406R user's right hand | 502 shot alignment graphic |
| 504 disc holding member | 506 "U" shaped finger pocket |
| 508 "U" shaped thumb pocket | 510 top surface of disc holding member |
| 512 bottom surface of disc holding member | 514 side of disc holding member |
| 516 attachment means | *110 scrbbing material* |
| 702 rigid or semi-rigid material | *210 absorbant material* |
| | *402A half circle pocket hand-held disc cleaning tool* |

First Embodiment

One embodiment of the hand-held disc cleaning tool 402 comprises a spine 102, front body section 202F, and a rear body section 202R (FIG. 1). The spine has a front edge 104F, a rear edge 104R, side edges 105, a bottom longitudinal surface 108, and a top longitudinal surface 106 (FIG. 3). The spine 102 is rectangular in shape and curved, and measures roughly 2.2 cm wide and 27 cm long. The spine can be made of, but not limited to, a durable, common material such as vinyl, nylon, ABS, polyethylene, polypropylene, rubber, leather, PVC, Thermoplastic elastomer, neoprene, or various impregnated or laminated fibrous materials, or a combination thereof. The spine has a scrubbing material that is made of a synthetic blade array 110A (FIG. 1), *110* (*FIG. 12*). The synthetic blade array has eight blades arranged in a circular pattern that are roughly 2 cm long and orientated at various angles. The synthetic blade array is attached to the spine's bottom longitudinal surface 108 by way of an adhesive, stitching or other suitable means. The synthetic blade array 110A is constructed much the same way as door mats commonly found at many stores. One such example of this material is Grassworx Clean Machine High Traffic Doormat. The spine can be made entirely out of this material, eliminating the need to be attached to a backing material.

Front body section 202F and rear body section 202R are congruent and made of a pliable material that can be deformed with the force typical of that of a user's hand. The body sections can be made of, but not limited to, a durable common material such as vinyl, nylon, polyethylene, polypropylene, rubber, leather, PVC, Thermoplastic elastomer, neoprene, or various impregnated or laminated fibrous materials, or a combination thereof. Both body sections have a top arched edge 204 which is roughly 27 cm long, a bottom edge 206 which is roughly 11 cm long, and side edges which are roughly 9.5 cm long (FIG. 1). The top arched edge is a section of a circular arc of a circle roughly 22 cm in diameter. The length from mid-point of top arched edge of body sections 202F, 202R to mid-point of bottom edge 206 is roughly 13 cm. Body sections 202F, 202R have an interior face 208 and an exterior face 209 (FIG. 1). The interior face of the body sections 208 have an absorbent material that is made of a multitude of worm shaped microfiber material 210A (*FIG. 1*), *210* (*FIG. 12*). The worm shaped structures measure roughly 2.8 cm long, and 6 mm wide (FIG. 1). The multitude of worm shaped microfiber material is attached to the interior faces of the body sections 202F, 202R by an adhesive or by stitching or other suitable means. The exterior faces of the body sections 209 have a shot alignment graphic 502 (FIG. 5).

The spine 102 is attached along the front edge 104F to the top arched edge of the front body section 204F (FIG. 2). The spine 102 is also attached along the rear edge 104R to the top arched edge of the rear body section 204R (FIG. 2). Spine and body sections are joined by lacing, stitching, adhesive or other suitable means. The resulting configuration is orientated so that the synthetic blade array 110A, and the multitude of worm shaped microfiber material 210A are adjacent to one another. The area of adjacent surfaces consisting of both body sections interior faces and the spine's bottom longitudinal surface make up the interior space of the hand-held disc cleaning tool.

Operation

My hand-held disc cleaning tool achieves its function by the user holding the tool 402 in one hand 406L and the recreational throwing disc 404 to be cleaned in other hand 406R. The user inserts the recreational throwing disc 404 inside the cleaning tool 402 making contact with the cleaning surface of the spine as the disc is rotated through the tool with their hand 406R (FIG. 4). The user can exert varying pressure with the hand holding the tool 406L as the disc is passed through to help aid in cleaning, and to facilitate contact of the cleaning surfaces to the contours of the disc. The tool 402 can also be used as a disc marker (FIG. 5). The user places the bottom edges 206 of the hand-held cleaning tool 402 in contact with the disc 404 as it lies on the ground (FIG. 5). Marking the placement of a disc is needed to insure the player is throwing from the proper position when the disc that is lying in the field of play is removed in preparation of the next throw. The player may use the shot alignment graphic 502 to line up his next shot. The tool 402 neatly stores, and is easily accessed within bags commonly used in disc golf.

Additional Embodiments

One embodiment has a rigid or semi-rigid material 702 that is located about the side edges of the spine 105 extending along the top longitudinal surface 106 for a predetermined length. The rigid or semi-rigid material 702 is further located about the bottom 206 and side edges 205 of both body sections and extends along the exterior faces for a predetermined length (FIG. 6). The rigid or semi-rigid material can be made of, but not limited to, ABS, PVC, Vinyl, Polyethene, Polypropylene, or some other suitable material that is generally solid and not inflexible. The ridged or semi-rigid material is located on no more than 80% of the total surface area of the external surface of the hand-held disc cleaning tool. The external surface of the tool consists of the top longitudinal surface of the spine 106 and both exterior faces 209 of the body sections. This arrangement of the materials allows for greater movement in certain areas and less in certain areas. This arrangement allows for better cleaning of different shaped discs while still maintaining the general shape of the tool overall.

Another embodiment of the tool has scrubbing material and absorbent material on the spine's bottom longitudinal surface 108 (not shown), as well as on the body sections interior faces 208. One example of this is the interior faces of the body sections have scrubbing and absorbent material present throughout (FIG. 7). The scrubbing material and absorbent material can also be localized to certain areas of the spine's bottom longitudinal surface or body section's interior face (not shown). The different cleaning materials can be located on the spine's bottom longitudinal surface and body section's interior face in any area, combination, quantity, and density.

The scrubbing material can be made of Bristles (not shown) of a thickness and stiffness to enable the removal of foreign matter from a recreational throwing disc and allow relatively easy passage of the disc through the hand-held cleaning tool. The bristles can extend at varying angles from the spine's bottom longitudinal surface, and the body sections interior face. The bristles can be synthetic or natural. One example of a type of bristle would be those found on toothbrushes, or brooms. The scrubbing material can be made of synthetic turf like material 110B of varying lengths, widths, and stiffness (FIG. 3). Synthetic turf and it's backing can also make up the spine in it's entirety. The synthetic blade array 110A can be arranged differently, and have more, or less blades, and orientate at different angles (not shown).

The absorbent material can be made of sponge like material of a predetermined length and shape. One example of this is tapered sponge 210B (FIG. 8) that is uniformly spaced and cone shaped. This arrangement allows movement of the tapered sponge segments so it can conform to the surface of the disc to be cleaned. The absorbent material can be made in the shape of stands 210C, (FIG. 9) of a predetermined length, either synthetic or natural, like those found on mops, dusters, and other cleaning implements. A couple examples are microfiber, and cotton stands roughly 35 mm in length and 2 mm in width. Other lengths and widths can be used, as well as other materials and shapes.

In one embodiment the spine curves for roughly half the circumference of a circle 24 cm in diameter, or roughly 40 cm, and then extends in a straight line for roughly 6 cm on both ends of the spine. Front and back body sections 202F, 202R top arched edges 204F, 204R follow the contour of the spine and have a straight bottom edge 206 resulting in an elongated hand-held disc cleaning tool (not shown).

An embodiment of the hand-held disc cleaning tool can further include a detachable disc holding member 504 (FIG. 10, FIG. 11). The detachable disc holding member has an "U" shaped finger pocket 506 at one end that allows the user to insert his fingers in, and a smaller "U" shaped thumb pocket 508 protruding from a side of the detachable disc holding member located in a position so the user can easily insert their thumb. The detachable member helps keep the user's hand clean, and aids in gripping the disc as it is rotated through the tool. The detachable disc mitt 504 has an attachment means 516 on the bottom surface (FIG. 11). The attachment means can be hook and loop, snap fastener, or another suitable material. The exterior face of the body section 202F/202R has the other half of the attachment means (not shown). The detachable disc mitt can be made of, but not limited to, a durable common material such as vinyl, nylon, polyethylene, polypropylene, rubber, leather, Thermoplastic elastomer, neoprene, or a combination thereof.

The user inserts his fingers in the finger pocket, and his thumb in the thumb pocket while holding the disc cleaning tool in the other hand. As the user moves his hand that is in contact with the disc holding member away from cleaning tool it detaches and provides a griping surface to aid in cleaning of the disc. The disc holding member can be reattached to the tool by matching up the different components of the attachment means on the exterior face of the tool and the bottom surface of the disc holding member.

Alternate Embodiment

The hand-held cleaning tool's spine 102, and body sections 202F, 202R can all be made from one piece, spine and body sections are seamless. The curvature of the spine 102 when viewed from the short axis can be minimal, flat, or substantial (not shown). The interior face of the body sections can be void of scrubbing and or absorbent material in an area extending from the top arched edge of the body sections 204F, 204R for a predetermined length (not shown). The top arched edge of the body sections can be a section of a circular arc of a circle roughly 21 cm in diameter to 34 cm in diameter. The bottom edge of the body sections 206 (*FIG. 1 and FIG. 12*) can be straight, arched 206A (FIG. 4) or a multitude of other shapes. The dimensions of the body sections and the spine can be larger or smaller than those described in the specification. Some examples are, but not limited to, midpoint of top arched edge to midpoint of bottom edge of body sections can be 3 cm to 23 cm long. The spine can be 6 cm to 55 cm long, and 10 mm to 30 mm wide. The lengths, widths, density, angles, and positioning of the scrubbing and absorbent material can be different than those depicted. Any of the features or materials listed can be in any combination within the hand-held disc cleaning tool or the different parts of the cleaning tool.

Advantages

From the description above, a number of advantages of some embodiments of my hand-held disc cleaning tool become evident:

a. The unique shape and materials of my cleaning tool aids in contact of cleaning surfaces to the different contours of recreational throwing discs.
b. The cleaning tool acts as a disc marker eliminating the need to carry a separate disc marking tool.
c. The shot alignment graphic on my cleaning tool helps players line up their next shot and possibly makes them more accurate in their shot placements.
d. The unique combination of scrubbing and absorbent materials allows relatively easy passage of disc through the cleaning tool, and effective cleaning of the disc.
e. High surface area and voids of space within the interior of the cleaning tool make it able to clean a large number of discs.
f. The design of the cleaning tool helps keep the user's hands free of dirt, water and other foreign matter.
g. Cleaning tool is light weight, easy to store within disc golf bags, and relatively inexpensive to make.

CONCLUSION, RAMIFICATIONS, AND SCOPE

Accordingly, the reader will see that the hand-held disc cleaning tool of the various embodiments is capable of cleaning recreational throwing discs simply and effectively. The components of the tool allow it to conform to different shaped discs and remove and absorb a large amount of foreign matter from throwing discs. Furthermore the tool can be used as a disc marker and shot alignment aid.

Although the description above contains many specificities, these should not be construed as limiting the scope of the embodiments but merely providing illustrations of some of several embodiments.

Thus the scope of the embodiments should be determined by the appended claims and their legal equivalents, rather than by the examples given.

I claim:

1. A hand-held disc cleaning tool comprising:

a. a spine that has a rectangular shape and is curved, said spine has a front edge, *a* rear edge, [side edges] *a first side edge, a second side edge*, *a* bottom longitudinal surface and a top longitudinal surface, said front edge, and said rear edge are greater in length than said *first and second* side edges, said bottom longitudinal surface of said spine has a scrubbing material along the surface *extending from said first side edge to said second side edge*;
b. two body sections [of a predetermined shape] made of a pliable material [that can be deformed with a force typical of a user's hand], said body sections include a front body section and rear body section, both said body sections have an arched top edge *which is a section of a circular arc*, [a bottom edge, side edges,] an exterior face, and an interior face, said interior faces have an absorbent material on the surface;
c. said front edge of said spine is contiguous *or continuous* or in close proximity to said front body section along said arched top edge, said rear edge of said spine is contiguous *or continuous* or in close proximity with said rear body section along said arched top edge, said hand held disc cleaning tool is configured so that said bottom longitudinal surface of said spine and both said interior faces of said front body section and said rear body section are adjacent and form an interior space of said hand held disc cleaning tool, said top longitudinal surface of said spine and both said exterior faces of said body sections constitute an external surface of said hand held disc cleaning tool;
d. whereby said hand held disc cleaning tool provides a cleaning surface for a recreational throwing disc when said recreational throwing disc is passed through said interior space of said hand held disc cleaning tool, and [said] *a* user's hand can deform the tool by applying [the] *a* force [typical of the user's hand] to said external surface to conform to a shape of said recreational throwing disc.

2. The hand held disc cleaning tool of claim 1 wherein said scrubbing material is an array of a multitude of synthetic blades, or synthetic turf like material, or a combination thereof, said absorbent material is a multitude of worm shaped microfiber material, or a multitude of strands of natural fiber, or a multitude of strands of synthetic fiber, *or sponge material,* or a combination thereof.

3. The hand held disc cleaning tool of claim 1 further comprising a [continuous] rigid or semi-rigid material that is attached to or in close proximity to [the side, and the bottom edges of said body sections along said exterior face for a predetermined length,] *said external surface of said hand-held disc cleaning tool,* said [continuous] rigid or semi-rigid material is further attached or in close proximity to said spine's said side edges along said top longitudinal surface for a predetermined length, said continuous rigid or semi-rigid material is located on or in close proximity to no more than 80% of the total surface area of said external surface of said hand held disc cleaning tool, whereby providing a structural support [means] for said hand held disc cleaning tool.

4. The hand held disc cleaning tool of claim 2 further comprising a [continuous] rigid or semi-rigid material that is attached to or in close proximity to [the side, and the bottom edges of said body sections along said exterior face for a predetermined length,] *said external surface of said hand-held disc cleaning tool,* said [continuous] rigid or semi-rigid material is further attached or in close proximity to said spine's said side edges along said top longitudinal surface for a predetermined length, said continuous rigid or semi-rigid material is located on or in close proximity to no more than 80% of the total surface area of said external surface of said hand held disc cleaning tool, whereby providing a structural support [means] for said hand held disc cleaning tool.

5. A method for cleaning recreational throwing discs, comprising:

a. providing a hand held disc cleaning tool comprising a spine that has a rectangular shape and is curved, said spine has a front edge, *a* rear edge, [side edges,] *a first side edge, a second side edge, a* bottom longitudinal surface and a top longitudinal surface, said front edge, and said rear edge are greater in length than said *first and second* side edges, said bottom longitudinal surface of said spine has a scrubbing material along the surface *extending from said first side edge to said second side edge*, two body sections [that are of a predetermined shape and] made of a pliable material [that can be deformed with a force typical of a user's hand], said body sections include a front body section and *a* rear body section, both having an arched top edge *which is a section of a circular arc*, [a bottom edge, side edges,] an exterior face, and an interior face, said interior faces have an absorbent material along a surface, said front edge of said spine is contiguous *or continuous* or in close proximity to said front body section along said arched top edge, said rear edge of said spine is [attached or] *contiguous or continuous or* in close proximity to said rear body section along said arched top edge, said hand held disc cleaning tool is configured so that said bottom longitudinal surface of said spine and both said interior faces of said front body section and said rear body section are adjacent and form an interior space of said hand held disc cleaning tool, said top longitudinal surface of said spine and both said exterior faces of said body sections constitute an external surface of said hand held disc cleaning tool;

b. holding said [hand held] *hand-held* disc cleaning tool in one hand as said recreational throwing disc is held in the other hand and inserted into said interior space of said hand held disc cleaning tool making contact with said spine as said other hand rotates said recreational throwing disc through said hand held disc cleaning tool;

c. whereby said recreational throwing disc is cleaned as it is rotated through said hand held disc cleaning tool, said user's hand can deform said hand held disc cleaning tool by applying [the] *a* force [typical of the user's hand] to said external surface to conform to a shape of said recreational throwing disc.

6. The method of claim 5 further comprising a rigid or semi-rigid material that is attached to or in close proximity to [the side, and the bottom edges of said body sections along said exterior face for a predetermined length, said rigid or semi-rigid material is further attached or in close proximity to said spine's said side edges along said top longitudinal surface for a predetermined length,] *said external surface of said hand-held disc cleaning tool,* said rigid or semi-rigid material is located on or in close proximity to no more than 80% of the total surface area of said external surface of said hand held disc cleaning tool, whereby providing a structural support [means] for said hand held disc cleaning tool.

7. The method of claim 5 further comprising a detachable disc holding member that is in the shape of a mitten, said detachable disc holding member has a "u" shaped finger pocket for the insertion of at least one of the user's fingers and extends along the front surface of said detachable disc holding member for a predetermined length, a "u" shaped thumb pocket for insertion of user's thumb protrudes from a side of the said detachable disc holding member, an angle of divergence of said thumb pocket from said finger pocket is less than 90 degrees, said thumb pocket extends along the front surface of said detachable disc holding member for a predetermined length, said detachable disc holding member has an attachment means on the back surface, said hand held disc cleaning tool has said attachment means on said exterior face of at least one of said body section.

8. The method of claim 6 further comprising a detachable disc holding member that is in the shape of a mitten, said detachable disc holding member has a "u" shaped finger pocket for the insertion of at least one of the user's fingers and extends along the front surface of said detachable disc holding member for a predetermined length, a "u" shaped thumb pocket for insertion of user's thumb protrudes from a side of the said detachable disc holding member, an angle of divergence of said thumb pocket from said finger pocket is less than 90 degrees, said thumb pocket extends along the front surface of said detachable disc holding member for a predetermined length, said detachable disc holding member has an attachment means on the back surface, said hand held disc cleaning tool has said attachment means on said exterior face of at least one of said body section.

9. A hand-held disc cleaning tool comprising:

a. a spine that has a rectangular shape and is curved, said spine has a front edge, *a* rear edge, [side edges,] *a first side edge, a second side edge, a* bottom longitudinal surface and a top longitudinal surface, said front edge, and said rear edge are greater in length than said side edges, said bottom longitudinal surface of said spine has a scrubbing material and an absorbent material along the surface *extending from said first side edge to said second side edge*;

b. two body sections [of a predetermined shape] made of a pliable material[that can be deformed with a force typical of a user's hand], said body sections include a front body section and rear body section, both said body sections have an arched top edge *which is a section of a circular arc*, [a bottom edge, side edges,] an exterior face, and an interior face, said interior faces have a scrubbing material and an absorbent material on the surface;

c. said front edge of said spine is contiguous*, or continuous* or in close proximity to said front body section along said arched top edge, said rear edge of said spine is contiguous*, or continuous* or in close proximity with said rear body section along said arched top edge, said hand held disc cleaning tool is configured so that said bottom longitudinal surface of said spine and both said interior faces of said front body section and said rear body section are adjacent and form an interior space of said [hand held] *hand-held* disc cleaning tool, said top longitudinal surface of said spine and both said exterior faces of said body sections constitute an external surface of said [hand held] *hand-held* disc cleaning tool;

d. whereby said hand [held disc] *held-disc* cleaning tool provides a cleaning surface for a recreational throwing disc when said recreational throwing disc is passed through said interior space of said hand held disc cleaning tool[, and said user's hand can deform the tool by applying the force typical of the user's hand to said external surface to conform to a shape of said recreational throwing disc].

10. The hand held disc cleaning tool of claim 9 wherein said scrubbing material is an array of a multitude of synthetic blades, or synthetic turf like material, or a combination thereof, said absorbent material is a multitude of worm shaped microfiber material, or a multitude of strands of natural fiber, or a multitude of strands of synthetic fiber, or a combination thereof.

11. The hand held disc cleaning tool of claim 9 further comprising a [continuous] rigid or semi-rigid material that is attached to or in close proximity to [the side, and the bottom edges of said body sections along said exterior face for a predetermined length, said continuous rigid or semi-rigid material is further attached or in close proximity to said spine's said side edges along said top longitudinal surface for a predetermined length,] *said external surface of said hand-held disc cleaning tool,* said [continuous] rigid or semi-rigid material is located on or in close proximity to no more than 80% of the total surface area of said external surface of said hand held disc cleaning tool, whereby providing a structural support means for said hand held disc cleaning tool.

12. The hand held disc cleaning tool of claim 10 further comprising a [continuous] rigid or semi-rigid material that is attached to or in close proximity to [the side, and the bottom edges of said body sections along said exterior face for a predetermined length, said continuous rigid or semi-rigid material is further attached or in close proximity to said spine's said side edges along said top longitudinal surface for a predetermined length,] *said external surface of said hand-held disc cleaning tool,* said [continuous] rigid or semi-rigid material is located on or in close proximity to no more than 80% of the total surface area of said external surface of said hand held disc cleaning tool, whereby providing a structural support [means] for said hand held disc cleaning tool.

*13. The hand-held disc cleaning tool of claim 1 wherein said body sections are joined to said spine by way of stitching.*

*14. The hand-held disc cleaning tool of claim 9 wherein said body sections are joined to said spine by way of stitching.*

* * * * *